United States Patent [19]

Krofta

[11] 4,151,093

[45] Apr. 24, 1979

[54] STOCKWASHER

[75] Inventor: Milos Krofta, Lenox, Mass.

[73] Assignee: Lenox Institute for Research, Lenox, Mass.

[21] Appl. No.: 889,943

[22] Filed: Mar. 24, 1978

[51] Int. Cl.² ............................................. B01D 33/04
[52] U.S. Cl. ................................. 210/386; 210/400
[58] Field of Search ................. 162/60, 307, 350;
210/400, 401, 77, 386, 67, 79, 332, 407, 408;
8/156; 68/181 R, 22 R

[56] References Cited

U.S. PATENT DOCUMENTS

| | | | |
|---|---|---|---|
| 2,073,654 | 3/1937 | Smiley | 162/307 |
| 2,890,149 | 6/1959 | Müller | 162/350 |
| 3,762,869 | 10/1973 | Kennedy et al. | 68/22 R |
| 4,081,375 | 3/1978 | Deal et al. | 210/400 |

Primary Examiner—Frank Sever
Attorney, Agent, or Firm—Edward T. Connors

[57] ABSTRACT

Apparatus for washing stock such as used in papermaking and like industries in which an upward moving inclined filter screen is used to separate washed stock from the washing water. A structure is provided carrying in counter flow movement an endless filter screen past an inlet for watered stock and past at least one washing station in which additional washing water is supplied. The washed stock is finally compacted between a drum and the filter screen to remove surplus water and conveyed away from the filter screen.

8 Claims, 2 Drawing Figures

STOCKWASHER

BACKGROUND OF THE INVENTION

In the paper, pulp and like industries stock for the manufacture of paper, fiberboard, etc. may be made, in some cases, partly or wholly from previously used materials such as old newspapers and other fibrous materials. Such materials are ground or pulped and may contain ink, dirt, fillers, fines, and other materials which require that the resulting stock be treated with chemicals, deinked and washed before use. Large amounts of water are used to wash the stock and must be partially removed from the stock carrying away treating chemicals, dirt and other impurities. As in all manufacturing operations it is essential that the stockwashing apparatus be efficient and economical in operation and compact in size.

DESCRIPTION OF THE PRIOR ART

It is known in the stock washing art to use filter screens to separate the stock from the washing water. In many instances horizontally positioned filter screens have been used, and in a few instances, so-called "side-hill" screens have been used in which a flat stationary screen has been positioned at an angle with respect to a horizontal position. In such constructions means have been provided to scrape the collected stock from the flat screens while in the case of the "side-hill" screens the stock flows off by reason of its water content and the action of gravity.

SUMMARY OF THE INVENTION

The present invention aims to overcome the difficulties and disadvantages of prior constructions by providing an improved stockwasher for washing pulped materials for use in the manufacture of paper, fiberboard and similar materials.

In accordance with the invention there is provided an improved apparatus in which an endless filter screen is passed at an inclined angle to receive watered stock on the screen. The stock is allowed to flow down the screen past at least one additional washing station, then is compacted somewhat between the screen and a compacting drum in order to remove surplus water. The washed stock is then conveyed to an outlet for use as desired. The apparatus is so arranged that the filter screen is moved upwardly along its support thereby providing increased travel for the watered stock as it flows downwardly over the surface of the screen.

The apparatus is advantageous in that the watered stock is in draining position over the screen for a longer time, thus permitting the use of smaller filter screens. Further, the construction lends itself to the use of additional washing stations. As the stock moves downward under the action of gravity, the screen is self-cleaning and the watered stock is delivered to the compacting station for ready removal by a screw conveyor.

The apparatus will wash at least half as much again as prior constructions comparable in size. The apparatus may be readily adjusted by varying the inclination angle of the screen as conditions warrant.

DESCRIPTION OF THE PREFERRED EMBODIMENT

Figure 1:
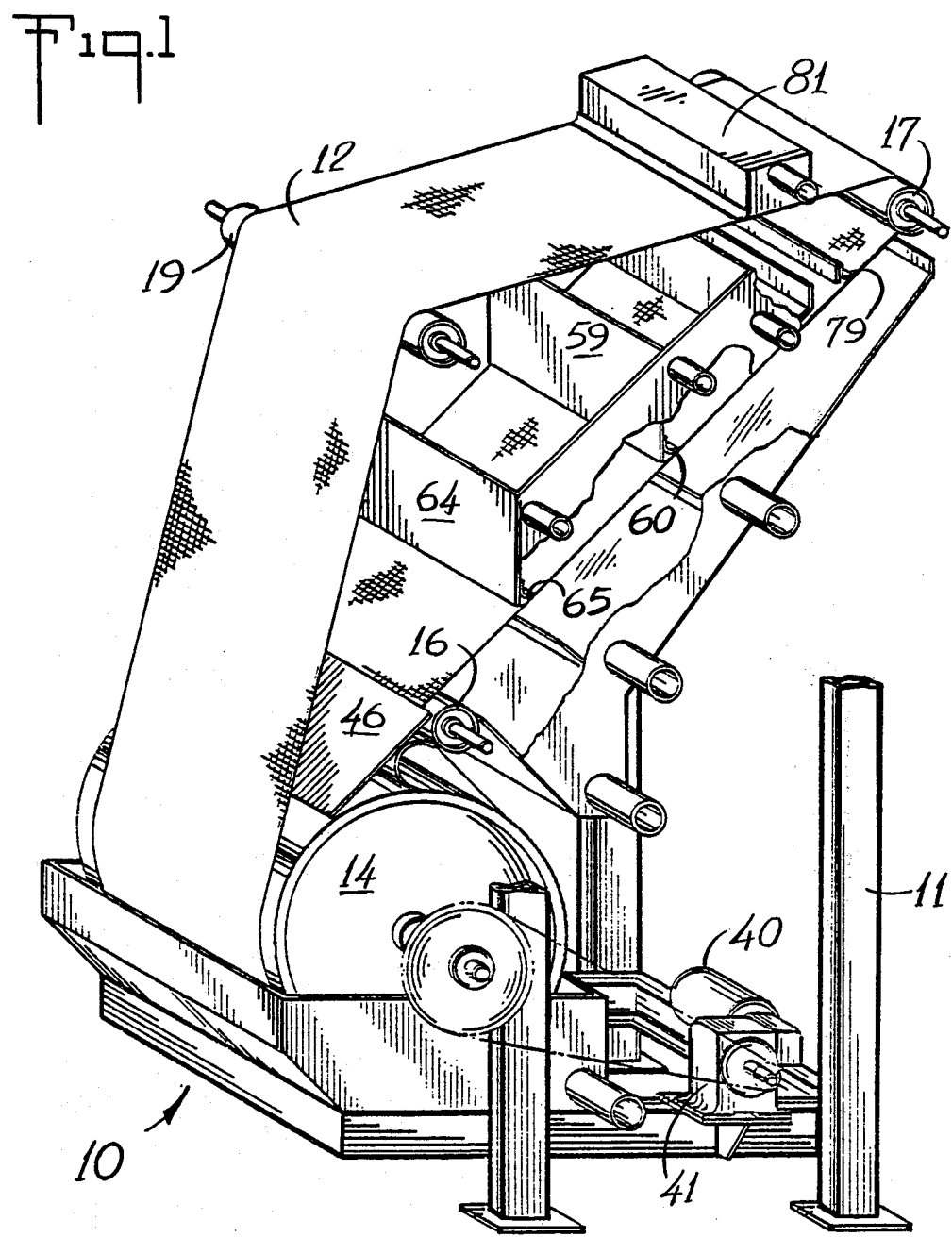
FIG. 1 is a partial perspective view of the apparatus in accordance with the invention. For simplicity of illustration portions of the structure have been omitted.
Figure 2:
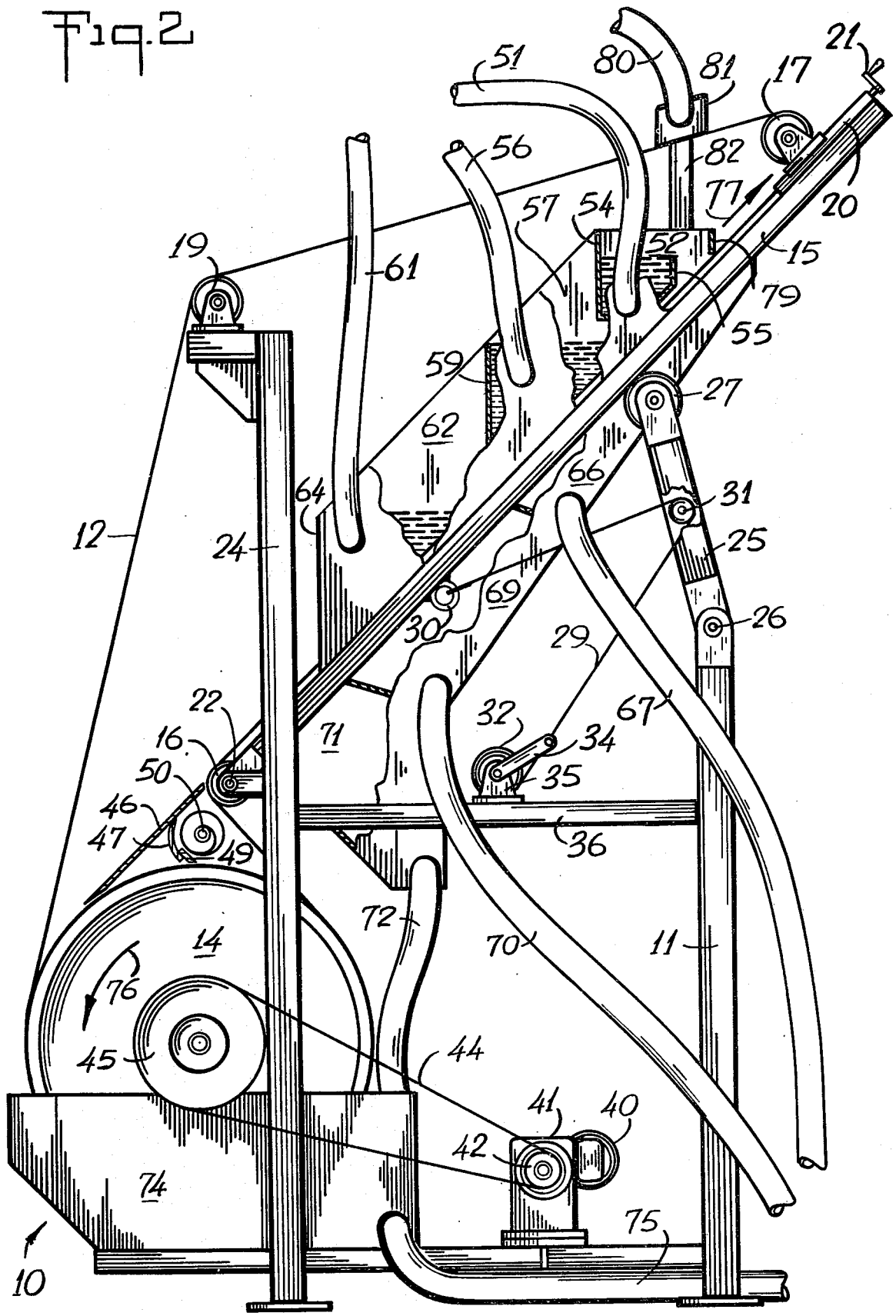
FIG. 2 is a side view of the apparatus of FIG. 1 with part shown as broken away to add clarity to the illustration.

Referring to the drawings there is shown in FIGS. 1 and 2 a stockwasher 10 in accordance with the invention. The stockwasher 10 is supported by a framework 11 adapted to carry an endless filter screen 12. A compacting drum 14 is positioned at the lower end of the apparatus. A screen supporting frame 15 (FIG. 2) is carried by the supporting frame 11 at an inclined angle with respect to horizontal. A plurality of rollers are used to carry the endless filter screen 12. A lower roller 16 is positioned at the lower end of the screen supporting frame 15. An idler roller 19 is carried by the framework 11 and is positioned to provide an open space inside the endless filter screen 12. Adjustment means 20 (FIG. 2) operated by a handle 21 may be manipulated to adjust the tension of the endless screen 12. The screen supporting frame 15 is pivotably mounted as indicated at 22 on upwardly extending member 24 of the frame 11.

Adjustment means for the inclination angle of the framework 15 includes a frame member 25 (FIG. 2) pivotably mounted at 26 on the upper end of a portion of the framework 11. At the upper end of the frame member 25 is a roller 27 adapted to bear against the underside of the screen supporting frame 15. A cable 29 is fixedly attached to the framework 15 by an attachment member 30 and is passed over a pulley member 31 carried by frame member 25. The end of the cable 29 is secured to and adapted to be rolled upon a cable adjustment drum 32 rotatable by an operating handle 34. The drum 32 is held in a desired position by means well known in the art. The drum 32 is carried by a mounting base 35 supported by a frame member 36.

Power for the movement of the screen 12 is provided by a motor 40 operating through a gear box 41 rotating a pulley 42 driving a belt 44 engaging a pulley 45 on the compacting drum 14. Other equivalent construction could be used, as for example, a sprocket and chain.

A stock guiding plate 46 (FIG. 2) is positioned beneath the lower roller 16 substantially in alignment with the path of the endless filter screen 12 as it extends along the inclined framework 15. Attached to the lower surface of the stock guiding plate 46 is supporting means 47 for a doctor blade 49 adapted to extend across the surface of the compacting roller 14 and positioned to scrape the surface free of any stock adhering thereto. The stock is thereby diverted to a screw conveyor 50 for discharge from the apparatus in any suitable manner as is well known in the art. The screw conveyor 50 may be suitably powered separately or may be driven by pulley means attached to the compacting drum 14.

Watered stock inlet means includes an inlet pipe 51 which at least in part may be made of flexible material. The inlet pipe 51 discharges stock into an overflow tank 52 having walls 54 and an overflow partition 55. Watered inlet stock is passed through the pipe into the overflow tank and discharged onto the endless filter screen 12. At least one washing station is provided and supplied with washing water through a pipe 56 supplying a bottomless tank 57 having an end wall 59. At the lower end of the end wall 59 is a flexible doctor blade 60 (FIG. 1) which scrapes against the surface of the endless filter screen 12.

If desired one or more additional washing stations may be provided as shown in which a supply pipe 61 leads water to a bottomless tank 62 having an end wall 64 likewise fitted with a doctor blade 65 (FIG. 1). Underneath and supported by the screen supporting frame 15 is a collection tank 66 provided with an at least partially flexible drainage pipe 67. An additional collection tank 69 is provided with an at least partially flexible drainage pipe 70. A third collection tank 71 is provided with an at least partially flexible drainage pipe 72 leading to a collection tank 74 positioned under the compacting drum 14 and emptied by a drainage pipe 75.

In the operation of the apparatus 10, motor 40 is energized rotating the compacting drum 14 in the direction of the arrow 76. Watered stock supplied through the pipe 51 into the overflow tank 52 passes over the overflow partition 55 and is evenly distributed across the width of the endless filter screen 12. As the filter screen 12 is moving upwardly at this point as indicated by the arrow 77, further upward movement of the watered stock past the tank 52 is prevented by a doctor blade 79. Under the action of gravity the stock then flows downwardly over the inclined screen 12 to meet additional washing water supplied through the pipe 56 and carried by bottomless tank 57. This water intermingles with the stock flowing down the inclined screen 12 and a portion of the water passes through the screen into the collection tank 66. The screen 12 is scraped by the doctor blade 60 (FIG. 1) and the mixture of stock and water is caused to overflow the top edge of the end wall 59 and again run down towards the upwardly moving screen 12 where additional washing water is supplied through the pipe 61 and caused to mix with the already washed stock by the water in the tank 62. At this point the washed stock passes over the end wall 64 and again contacts the filter screen 12 sliding down over same and over the stock guiding plate 46 to be compacted between the undersurface of the filter screen 12 and the outer surface of the compacting drum 14. A large portion of the water in the stock in thereby removed and the dewatered compacted stock is scraped from the surface of the compacting drum 14 by the doctor blade 49 and picked up by the screw conveyer 50 for discharge.

In order to backwash the endless filter screen 12 wash water supplied through a pipe 80 is discharged into a discharge nozzle 81 extending across the width of the endless filter screen 12 and carried by a frame member 82 attached to the support frame 15.

In commercial embodiments of the invention apparatus is provided in which the widths of the inclined screen may vary in widths from one half to four meters. The capacity of the various sized models is such as to wash about ten bone dry tons per 24 hour day per meter in width of the screen. The inclination of the screen may be varied from 30 to 60 degrees, preferably being used at an angle of about 40 degrees. The screen is moved at a rate of about two inches per second and is preferably made of a woven construction of plastic materials such as nylon, although other constructions and materials may be used.

It is apparent from the preceding description that an improved apparatus has been provided for washing pulped materials in the manufacture of paper, fiberboard and similar materials.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

I claim:
1. Apparatus for washing stock for use in the paper, pulp and like industries comprising
   a supporting framework,
   an endless filter screen,
   a compacting drum positioned at the lower end of said framework,
   plural washing station means spaced along said framework above said compacting drum,
   a screen supporting frame carried by said supporting framework at an inclined angle with respect to horizontal,
   means to adjust said inclined angle from about 30° to about 60°,
   roller means carried by both said frameworks supporting said endless filter screen along said inclined framework and around said compacting drum,
   motor means for moving said screen upwardly along said inclined framework,
   watered stock inlet means and washing water inlet means positioned over said filter screen and carried by said inclined framework, said washing water means feeding wash water to each of said plural washing station means,
   doctor blade means for scraping stock from the top surface of said inclined screen so that said stock is washed and a portion of the washing water drained by said screen, said washed stock flowing downwardly to be compacted between the under surface of said screen and said compacting roller,
   and washed stock removal means positioned above said compacting roller and within the periphery of said endless filter screen.
2. Apparatus according to claim 1 in which said watered stock inlet means is an overflow tank extending across the width of said filter screen.
3. Apparatus according to claim 1 in which said washing water inlet means is at least one overflow tank extending across the width of said filter screen.
4. Apparatus according to claim 1 in which adjustment means is provided to vary the tension on said endless filter screen.
5. Apparatus according to claim 1 in which said washed stock removal means is a screw conveyor.
6. Apparatus according to claim 5 in which a doctor blade is provided to clear washed stock from the surface of said compacting drum and direct the sludge towards said screw conveyor.
7. Apparatus according to claim 1 in which spray washing means is provided to backwash said endless screen.
8. Apparatus according to claim 1 in which said watered stock inlet means is an overflow tank extending across the width of said filter screen, said washing water inlet means is at least one overflow tank extending across the width of said filter screen, motor means is provided to rotate said compacting drum and thereby upwardly drive said endless filter screen, adjustment means is provided to vary the angle of said inclined framework, adjustment means is provided to vary the tension on said endless filter screen, said endless filter screen passes around and over said overflow tank said doctor blade means for scraping stock from said inclined screen being positioned at the bottom of said overflow tank, said washed stock removal means is a screw conveyor, spray washing means is provided to backwash the endless screen, and a doctor blade is provided to clear washed stock from the surface of said compacting drum and direct the sludge towards said screw conveyor.

* * * * *